United States Patent [19]

Dirkse et al.

[11] Patent Number: 4,535,242
[45] Date of Patent: Aug. 13, 1985

[54] METHOD AND A CIRCUIT FOR PROCESSING PULSES OF A PULSE TRAIN

[75] Inventors: Franciscus J. Dirkse, Nieuwkoop, Netherlands; Gerardus H. Kulberg, deceased, late of Noorden, Netherlands, by Julia F. Kulberg-Nierstrasz, heiress

[73] Assignee: Siemens Gammasonics, Inc., Des Plaines, Ill.

[21] Appl. No.: 471,915

[22] Filed: Mar. 3, 1983

[51] Int. Cl.³ .............................................. G01T 1/161
[52] U.S. Cl. .................. 250/363 S; 250/369
[58] Field of Search ............... 250/363 R, 363 S, 366, 250/369, 363.7; 364/414, 571

[56] References Cited

U.S. PATENT DOCUMENTS

| | | | |
|---|---|---|---|
| 3,011,057 | 11/1961 | Anger | 250/71.5 |
| 3,752,988 | 8/1973 | Culver | 250/270 |
| 3,872,287 | 3/1975 | Koeman | 235/151.31 |
| 3,984,689 | 10/1976 | Arseneau | 250/369 |
| 4,024,398 | 5/1977 | Hatch | 250/363 S |
| 4,051,373 | 9/1977 | Hatch | 250/363 S |
| 4,323,977 | 4/1982 | Arseneau | 250/369 |

OTHER PUBLICATIONS

Nuclear Instruments and Methods in Physics Research, vol. 206, No. 3, Feb./Mar. 1983, pp. 465-469, North-Holland Pub. Co., J. Gal et al.

Instruments and Experimental Tech., vol. 22, No. 6, part 1, Nov./Dec. 1979, pp. 1491-1508, Plenum Pub. Corp., Ivanov et al.

Primary Examiner—Janice A. Howell
Attorney, Agent, or Firm—John F. Moran

[57] ABSTRACT

Improved method and circuit are disclosed for processing pulses of a pulse train such that tails of pulses ("A" pulses) which precede a valid true pulse ("T" pulse) to be processed and/or pile-up pulses ("P" pulses) which are piled up on the tails of preceding "T" pulses are eliminated. To eliminate the tails of an "A" pulse a first signal is produced at the occurrence of a "T" pulse. This first signal simulates the tail of the "A" pulse and it is subtracted from the tail piled up "T" pulse. To eliminate a "P" pulse a second signal is produced, when a "P" pulse piled up on the "T" pulse occurs. This second signal simulates the tail of the "T" pulse which tail is cut off at the occurrence of a "P" pulse. This simulated tail is then processed instead of the true tail of the "T" pulse.

55 Claims, 16 Drawing Figures

"A" PULSE ELIMINATION

FIG. 3

"P" PULSE ELIMINATION

FIG. 4

"A" AND "P" PULSE ELIMINATION

METHOD AND A CIRCUIT FOR PROCESSING PULSES OF A PULSE TRAIN

BACKGROUND OF THE INVENTION

1. Field of the Invention

The invention generally relates to a method and a circuit for processing pulses of a pulse train such that tails of pulses which precede a pulse to be processed and/or pile-up pulses which are piled up on the tails of preceding pulses to be processed are eliminated. Thereby the pulses can be processed in analog or digital form.

The invention is particularly suited for use in a radiation detector, such as a scintillation camera for detecting gamma rays.

2. Description of the Prior Art

Radiation detectors are widely used as diagnostic tools for analyzing the distribution of a radiation-emitting substance in an object under study, such as for the nuclear medical diagnosis of a human body organ. A typical radiation detector is a commercial version of the Anger-type scintillation camera, the basic principles of which are described in Anger U.S. Pat. No. 3,011,057.

Such a scintillation camera can take a "picture" of the distribution of radioactivity throughout an object under investigation, such as an organ of the human body which has taken up a diagnostic quantity of a radioactive isotope. As individual gamma rays are emitted from the distributed radioactivity in the object and pass through a collimator, they produce scintillation events in a thin planar scintillation crystal. The events are detected by photodetectors positioned behind the crystal. Electronic position computation circuitry translates the output pulses of the photodetectors into X and Y coordinate signals which indicate the position in the crystal of each event and a Z signal which indicates generally the energy of the event and is used to determine whether the event falls within a preselected energy window. A picture of the radio-activity distribution in the object may be obtained by coupling the X, Y and Z signals which fall within the preselected energy window to a display, such as a cathode ray oscilloscope which displays the individual scintillation events as spots positioned in accordance with the coordinate signals.

In commercial scintillation cameras, the position computation circuitry has normally been constructed so that processing of output pulses of the photodetectors emanating from different detected radioactive events have necessarily been performed sequentially. That is, pulses could be accepted and processed from only one quanta of radiation at a time. With regard to tails of ANTE or "A" pulses, i.e. tails of pulses which precede a pulse to be processed, prior art uses circuitry to check that the baseline has returned to zero within finite limits before a pulse is allowed to be processed. If the baseline exceeds that limit, an otherwise perfectly valid pulse is not accepted, but does impair the base line level for subsequent pulses. In the case of POSTE or "P" pulses, i.e., invalid pile-up pulses which are pile-up on the tails of preceding valid pulses to be processed, prior art such as disclosed in U.S. Pat. No. 3,984,689 uses circuitry which detects if a pile-up pulse occurs while a valid pulse is being processed and then dumps both, the valid pulse and the invalid pile-up pulse.

Other prior art such as disclosed in U.S. Pat. Nos. 4,024,398 and 4,051,373 include compensated delay line clipping circuitry for narrowing data representing pulses in order to minimize data loss due to pile-up and a restoring circuit for minimizing baseline fluctuation of a data signal. The circuit of U.S. Pat. No. 3,752,988 utilizes a combination of energy discrimination and delay logic for eliminating pulse-pile-up by delaying the processing of any pulses that would otherwise follow too soon after any given pulse.

All prior art methods and circuits are relatively complicated in technical design and they only provide pulse processing rates which are relatively slow.

SUMMARY OF THE INVENTION

1. Objects

It is an object of the present invention to provide improved method and circuit for processing pulses with higher speed processing rates.

Another object of the present invention is to provide a high speed processing method and circuit which are relatively simple in technical design.

2. Summary

In a broad aspect the invention is directed to a method and circuit for processing pulses of a pulse train such that tails of pulses which precede a pulse to be processed are eliminated, wherein a signal is produced at the occurrence of a pulse to be processed, which signal extrapolates the known and constant decay curve of the tail of a preceding pulse and wherein said extrapolating signal is superimposed with said pulse to be processed to form a differential signal, which differential signal is provided for processing.

The invention is further directed to a method and a circuit for processing pulses of a pulse train such that pile-up pulses which are piled up on the tails of preceding pulses to be processed are eliminated, wherein a signal is produced at the occurrence of a pile-up pulse following a pulse to be processed, wherein said signal extrapolates the known and constant decay curve of the tail of said pulse to be processed and wherein those remaining parts of said pulses which are not yet processed are suppressed at the instant of the occurrence of said pile-up pulse and wherein said suppressed remaining parts of said pulses are replaced by said extrapolating signal.

The invention thus uses the known and constant decay curve of a pulse in a pulse train to eliminate "A" pulses by subtracting extrapolated tails of "A" pulses and a pulse to be processed from each other. Besides, the invention uses also the know and constant decay curve of a pulse in a pulse train to eliminate "P" pulses by replacing such remaining parts of pulses to be processed by extrapolated tails of said pulses to be processed, which remaining parts are suppressed together with a pile-up pulse.

Thus the invention provides a relatively simple method and circuit for processing pulses which are free from the influence of "A" and "P" pulses such that processing rates are provided which are faster compared to the prior art. In the scope of the invention all pulses can be processed in analog form or they can be processed in digital form. In the latter case the pulses have to be digitalized and then processed on a numerical basis by an digital processor.

There have thus been outlined rather broadly the more important objects, features and advantages of the invention in order that the detailed description thereof that follows may be better understood, and in order that the present contribution to the art may be better appreciated. There are, of course, additional features of the invention that will be described more fully hereinafter. Those skilled in the art will appreciate that the conception on which this disclosure is based may readily be utilized as the basis for the designing of other arrangements for carrying out the purposes of this invention. It is important, therefore, that this disclosure be regarded as including such equivalent arrangements as do not depart from the spirit and scope of the invention.

BRIEF DESCRIPTION OF THE DRAWINGS

While the other features of the invention are set forth with particularity in the appended claims, the invention will be better understood, along with other features thereof, from the following detailed description taken in conjunction with the drawings, in which:

DESCRIPTION OF A PREFERRED EMBODIMENT

Figure 1A:
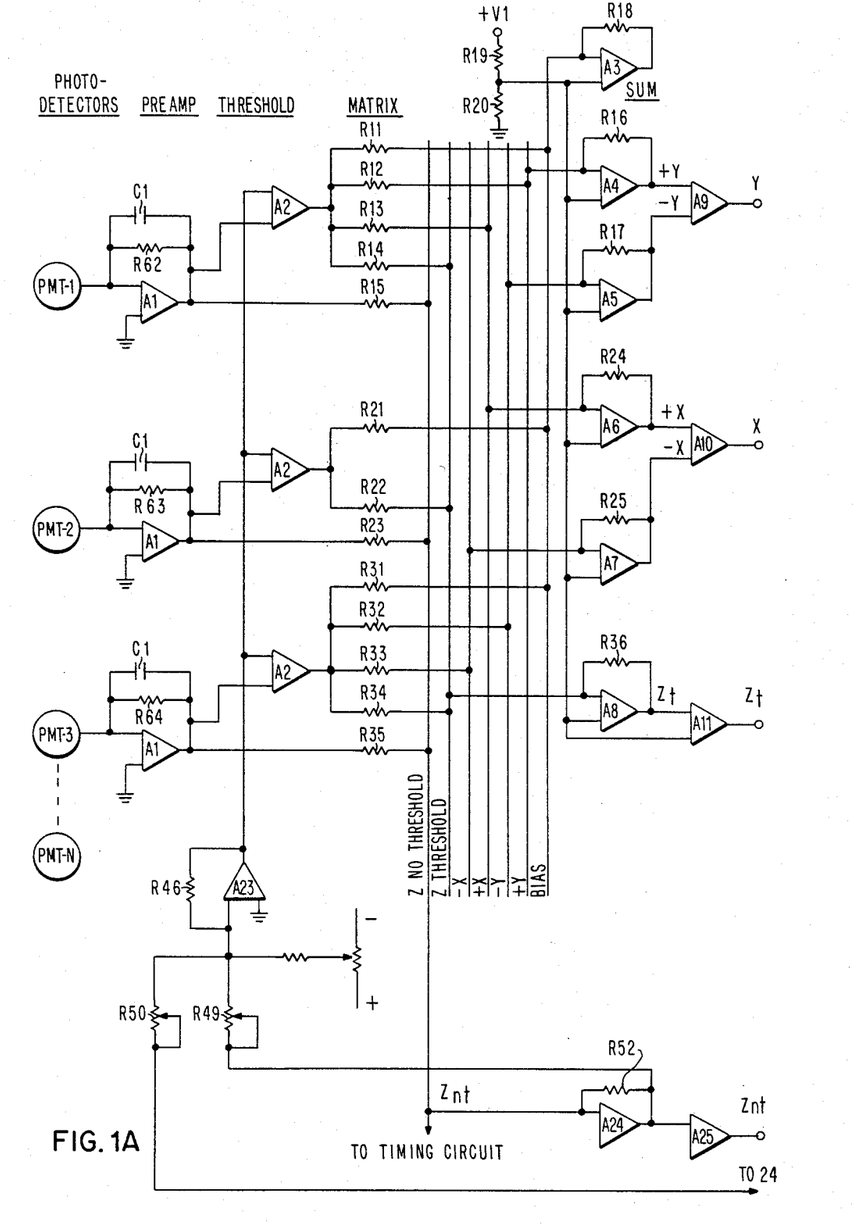
FIG. 1A and FIG. 1B are a schematic drawing embodying the principles of operation of the present invention in an application involving processing of scintillation events detected by a scintillation camera.
Figure 1B:
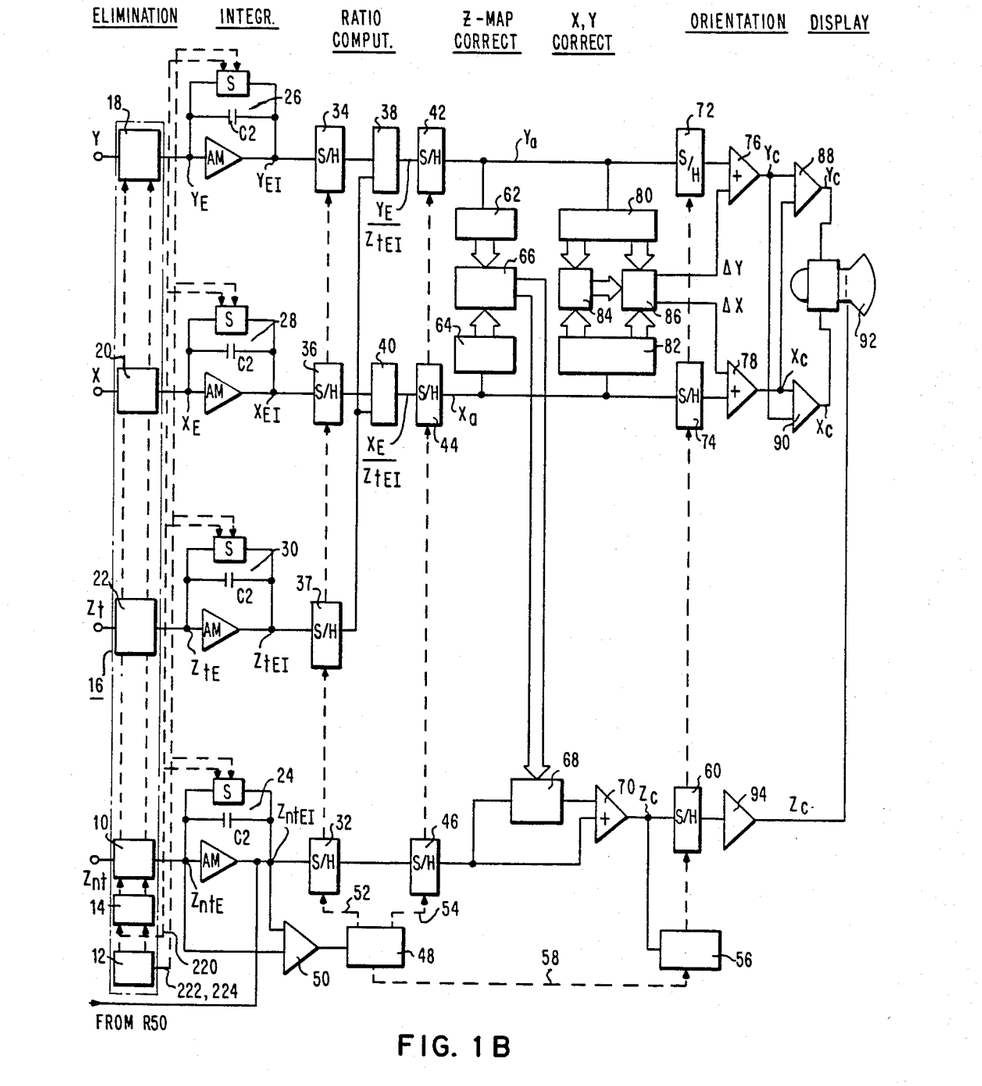

With reference to FIGS. 1A and 1B an Anger-type scintillation camera has a plurality of photomultiplier tubes PM-1 through PM-N (typically 19 or 37 tubes mounted in a hexagonal array behind a scintillation crystal) which function together to detect a scintillation event that occurs when a gamma ray impinges on the scintillation crystal (the tubes PM-1 through PM-N are labeled "PHOTODETECTORS"). For purposes of simplification, only the circuitry associated with the first three photomultiplier tubes PM-1, PM-2, and PM-3 is illustrated in detail. The details of the circuitry of FIGS. 1A and 1B are described only insofar as they contribute to an understanding of the principles, structure and operation of the claimed invention which relates to the "A" and "P" pulses elimination portions. The reader is referred to Anger U.S. Pat. No. 3,011,057, Kulberg et al. U.S. Pat. No. 3,732,419; and Arseneau U.S. Pat. Nos. 3,984,689 and 4,323,977 for example for further details of the other aspects of the illustrated circuitry.

The outputs of the photomultiplier tubes PM-1 through PM-N are separately coupled to respectively corresponding preamplifier circuits A1 ("PREAMP"). Each preamplifier circuit A1 has an output coupled to a separate threshold amplifier circuit A2 ("THRESHOLD"). Each of the threshold amplifiers A2 subtracts a prerequisite threshold voltage from the output of the particular preamplifier A1 with which it is associated. An amplifier A23 with a feedback loop employing a resistor R46 supplies a threshold bias to the threshold amplifiers A2. The threshold voltage is established as a function of the energy of the incoming scintillation event.

The threshold amplifiers A2 operate to pass the preamplifier A1 output signals to the resistor matrix ("MATRIX") and summing amplifiers A4 through A8 ("SUM") whenever the output signal from the corresponding preamplifier A1 exceeds the value of the threshold voltage. If the output of any of the respective preamplifiers A1 is below the threshold, the output signal of the corresponding threshold amplifier A2 is substantially zero. From the threshold preamplifier A1 outputs, the resistor matrix and summing amplifiers A4 through A8 develop positional coordinate output signals $+Y$, $-Y$, $+X$, $-X$, and a thresholded energy signal $Z_t$. The $+Y$, $-Y$ output signals are fed to a differential amplifier A9 where the $+Y$ and $-Y$ signals are consolidated into a single event Y positional coordinate signal. Similarly, the differential amplifier A10 developes a single consolidated X positional coordinate signal. The $Z_t$ signal passes through the amplifier A11.

The preamplifiers A1 also have outputs, connected through resistors R15, R23 and R35 directly to a "Z NO THRESHOLD" signal line of the resistor matrix, that are summed to provide an unthresholded energy signal $Z_{nt}$ which represents the total energy of the scintillation event. The unthresholded energy signal $Z_{nt}$ is passed through amplifiers A24 and A25 to a $Z_{nt}$ elimination circuitry 10 for "A" and/or "P" pulse elimination with regard to the signal $Z_{nt}$ according to the invention. The $Z_{nt}$ elimination circuitry 10 is controlled by a "T" and "P" pulse detector circuitry 12 over a switching logic circuitry 14 and it is part of a complex elimination circuitry 16 ("ELIMINATION") which also comprises a Y elimination circuitry 18, an X elimination circuitry 20 and a $Z_t$ elimination circuitry 22. The Y elimination circuitry 18 corrects the Y positional coordinate signal such that "A" and/or "P" pulses are eliminated. The X elimination circuitry 20 corrects the X positional coordinate signal and the $Z_t$ elimination circuitry 22 corrects the $Z_t$ signal such that in both cases "A" and/or "P" pulses are also eliminated.

Using $Z_{nt}$ elimination circuitry together with each of the X, Y and $Z_t$ elimination circuitries is only a preferred embodiment of the invention. It will be obvious to those skilled in the art to which the invention pertains to use a $Z_{nt}$ elimination circuitry or any of the other elimination circuitries solely to perform the invention. Also using a $Z_{nt}$ elimination circuitry together with only one or any given combination of the X, Y and $Z_t$ elimination circuitries is possible with regard to the invention.

The signals $Z_{ntE}$, $Y_E$, $X_E$, $Z_{tE}$ at the outputs of the $Z_{nt}$, $Y$, $X$, $Z_t$ elimination circuitries 10, 18, 20, 22 which are released from "A" and/or "P" pulses are then passed as respective inputs to integrator circuitries 24, 26, 28 and 30 ("INTEGRATION") to provide integrated signals $Z_{ntEI}$, $Y_{EI}$, $X_{EI}$, and $Z_{tEI}$. Each of the integrator circuitries 24, 26, 28 and 30 comprises an amplifier AM, an integrating capacitor C2, and a starting and reset switch S. The outgoing signals $Z_{ntEI}$, $Y_{EI}$, $X_{EI}$, and $Z_{tEI}$ serve as respective inputs to sample and hold circuitries 32, 34, 36 and 37. The outputs of the sample and hold circuitries 34, 36 and 37 are connected to the inputs of a first and second ratio computation circuitry 38 and 40. The first ratio computation circuitry forms a ratio signal $Y_E/Z_{tEI}$ from the signals $Y_E$ and $Z_{tEI}$. The second ratio computation circuitry forms a ratio signal $X_E/Z_{tEI}$ from the signals $X_E$ and $Z_{tEI}$. The outputs of the ratio computation circuitries 38, 40 are connected to the inputs of sample and hold circuitries 42 and 44. The output of the sample and hold circuitry 32 is connected to the input of a sample and hold circuitry 46.

The sample and hold circuitries 32, 34, 36, 37 and the sample and hold circuitries 42, 44 and 46 are triggered by a first pulse height analyzer 48 at succeeding times. The first pulse height analyzer 48 is controlled by the output signal of an amplifier 50, the inputs of which are connected to the input and the output of the integrator circuitry 24 for the $Z_{ntE}$ signal. When an integration of the integrator circuitry 24 has been finished, i.e. when a $Z_{ntE}$ signal has fully developed the pulse height analyzer 48 produces a first trigger signal on dotted line 52 which first trigger signal triggers the sample and hold circuitries 32, 34, 36 and 37 simultaneously to sample and hold the actual values of the $Z_{ntEI}$, $Y_{EI}$ and $X_{EI}$ signal. After a specific time period, i.e. the time the ratio computation circuits 38 and 40 need for forming the ratio signals $Y_{EI}/Z_{tEI}$ and $X_{EI}/Z_{tEI}$, the pulse height analyzer 48 produces a second trigger signal on dotted line 54 which triggers the sample and hold circuitries 42, 44 and 46 simultaneously to sample and hold the actual output values of the ratio computation circuits 38, 40 on the one hand and the output value of the sample and hold circuitry 32 on the other hand.

The pulse height analyzer 48 also triggers a second pulse height analyzer 56 over a dotted line 58. The second pulse height analyzer 56 works as an energy analyzer which determines whether the energy of an energy corrected signal $Z_c$ falls within a preselected window (i.e. whether a signal is "valid"). The energy corrected signal $Z_c$ is produced by an on-line energy correction circuit as described in the Arseneau U.S. Pat. No. 4,323,977 for example, this on-line energy correction circuit comprises an analog to digital converter 62 for the output signal $Y_a$ of the sample and hold circuitry 42 and an analog to digital converter 64 for the output signal $X_a$ of the sample and hold circuitry 44. It further comprises a $\Delta Z$ correction factor memory 66, and an energy signal modification circuitry 68 and a first mixer 70. The energy corrected signal $Z_c$ is passed to the pulse height analyzer 56 on the one hand and the sample and hold circuitry 60 on the other hand. When the energy falls within the energy window of the pulse height analyzer 56, i.e. when the detected event from which the Z-corrected signal $Z_c$ is derived from is valid, the pulse height analyzer 56 triggers the sample and hold circuitry 60. The actual value of the $Z_c$ signal is then shifted to the sample and hold circuitry 60.

Beside triggering the sample and hold circuitry 60 the pulse height analyzer also triggers two further sample and hold circuitries 72 and 74. Due to this fact the actual value of the signal $Y_a$ is shifted to the sample and hold circuit 72 and the actual value of the signal $X_a$ is shifted to the sample and hold circuit 74 at the same time when the actual value of the signal $Z_c$ is shifted to the sample and hold circuitry 60. The output of the sample and hold circuitry 72 is connected to the first input of a second mixer 76. The second input of the second mixer 76 is connected to a first output $\Delta Y$ of a spatial distortion correction circuitry. The output of the sample and hold circuitry 74 is connected to a first input of a third mixer 78. The second input of the third mixer 78 is connected to a second output $\Delta X$ of the spatial distortion correction circuitry. The spatial distortion correction circuitry is also well-known in the art and for example described in the Arseneau U.S. Pat. No. 4,323,977. It comprises an analog to digital converter 80 for the signal $Y_a$ and an analog to digital converter 82 for the signal $X_a$. It further comprises a correction co-efficient memory 84 and a correction interpolator 86 which can also comprise a distortion correction modification unit. The output signals $\Delta Y$, $\Delta X$ of the correction interpolator 86 are the outputs of the spatial distortion correction circuitry. The mixers 76 and 78 correct the signals $Y_a$ and $X_a$ with regard to the correction signals $\Delta Y$, and $\Delta X$. The corrected signal $Y_C$ at the output of the mixer 76 is then applied through a first orientation amplifier 88 to the vertical input of a display unit 92, such as a cathode ray oscilloscope. The corrected signal at the output of the mixer 78 is applied through a second orientation amplifier 90 to the horizontal input of the display unit 92. The output signal of the sample and hold circuitry 60 is passed through an unblank stage 94 to the Z input of the display unit 92. Thus the display unit 92 displays the individual scintillation events as spots positioned in accordance with the corrected coordinate signals $Y_C$ and $X_C$.

Figure 2:
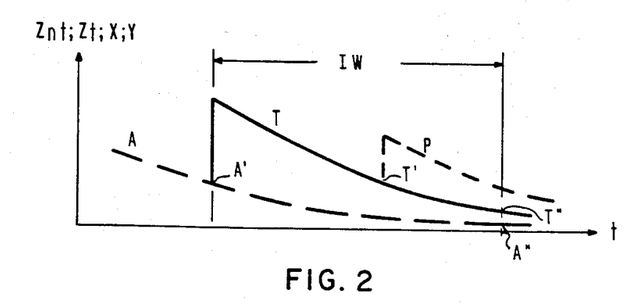
FIG. 2 is a schematic pulse diagram showing a pulse to be processed together with the tail of an "A" pulse and a piled-up "P" pulse.

Referring now to FIG. 2, this figure shows in a schematic pulse diagram a typical pulse configuration which can possibly occur in a $Z_{nt}$, $Z_t$, $X$ and $Y$ signal as described previously and which has to be processed according to the invention. In FIG. 2 the dashed (long dashes) line is the tail of a "A" pulse that precedes a potentially valid true pulse "T" shown as a solid line. A piling up or "P" pulse shown in dashed (short dashes) line may arrive while the integration time window IW of an integrator circuitry 24, 26, 28 and 30 is open and thus impairs proper integration of the valid true pulse "T".

Figure 3:
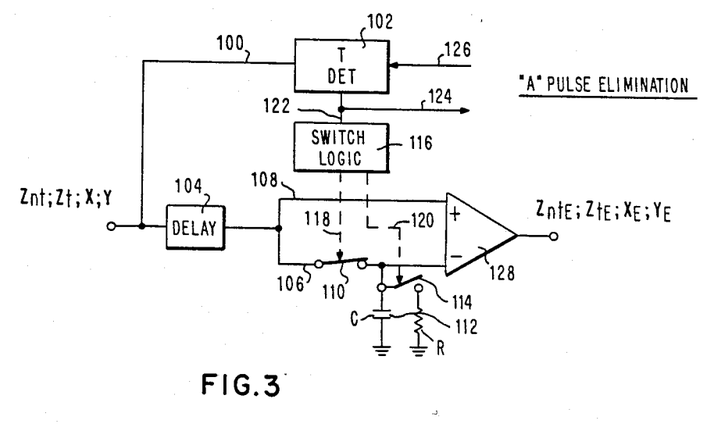
FIG. 3 is a schematic drawing showing the principles of design and operation of the present invention with regard to the elimination of solely the tails of "A" pulses.

A circuit for "A" pulse elimination according to the invention is generally shown in FIG. 3. In this circuit the incoming signal ($Z_{nt}$, $Z_t$, $X$ or $Y$) is applied into a first channel 100 which comprises a "T" pulse detector circuitry 102 for the detection of a "T" pulse. It is also applied delayed by a delay circuit 104 which has a delay time of 100 ns or less (Avionics MD100 Z175 for example) to a second channel 106 and a third channel 108. The second channel comprises a switch 110 and a RC circuit 112. The RC circuit 112 comprises a capacitor C and an ohmic resistance R. It also comprises a switch 114. The switch 110 in the second channel is controlled by a switch logic circuitry 116 via dashed line 118. The switch 114 of the RC circuit 112 is also controlled by said switch logic circuitry 116 via dashed line 120. The switch logic circuitry 116 is controlled by the "T" pulse detector circuitry 102 via line 122. Via line 124 an intergrator circuitry following the circuit of FIG. 3 can be started to integrate a "T" pulse detected by the "T" pulse detector circuit 102.

Via line 126 the "T" pulse detector circuitry 102 can be reset at the end of integration time (normally about 900 ns). The second channel is connected with the inverting input of a differential amplifier 128. The third channel is connected with the non inverting input of said differential amplifier 128.

The "T" detector circuitry 102 is a leading edge detector (Signetics NE 521 for example) which by differentiation and comparison, decides within a short period of time—less than 100 ns—whether a pulse is likely to reach an adjusted threshold. If so, the occurrence of a potentially valid true pulse, i.e. a "T" pulse, is supposed by the "T" detector circuitry 102. As an answer the "T" detector circuitry 102 produces an output signal on lines 122 and 124 respectively. The signal on line 122 sets the integration window IW. An intergrator circuitry at the output of the circuitry of FIG. 3 (see FIG. 1) then starts integration. The output signal of the "T" detector circuitry also switches the switch logic circuitry 116 via line 122. The switch logic circuitry 116 then opens the switch 110 in the second channel via dashed line 118, which switch 110 is normally closed. Simultaneously switch 114 in the RC circuit, which normally is open, is closed. As a result of both switching operations the signal in the second channel 106 is switched off said second channel and instead a discharging signal of the RC circuit 112 is supplied to the second channel 106. The discharging signal is produced by the capacitor C of the RC circuit on unloading over the ohmic resistance from a starting value which corresponds to the last stored actual value of the switched off signal in the second channel, with a decay curve which extrapolates the known and constant decay curve of a pulse of said switched off signal. Thus, if a "A" pulse precedes a "T" pulse, as shown in FIG. 2, the last stored signal value in said capacitor C of said RC circuit 112 at the occurrence of said "T" pulse in the second channel is a value A' of the tail of the "A" pulse as indicated in FIG. 2. Thus, the capacitor C of the RC circuit discharges from the value A' with a time constant which corresponds to the time constant of the decay curve of the tail of the preceding "A" pulse between A' and A". This discharging signal of said capacitor C of said RC circuit 112, which simulates the tail of a "A" pulse is then superimposed with the signal in said third channel by the differential amplifier 128 such that the discharge signal in the second channel 106 is subtracted from the signal in the third channel 108. As the signal in the third channel 108 is the "T" pulse piled up on the tail of the "A" pulse, as shown in FIG. 2, due to the subtraction a "A" pulse eliminated signal ($Z_{ntE}$, $Z_{tE}$, $X_E$ or $Y_E$) is produced at the output of the differential amplifier 128 i.e. a potentially valid true "T" pulse.

Figure 4:
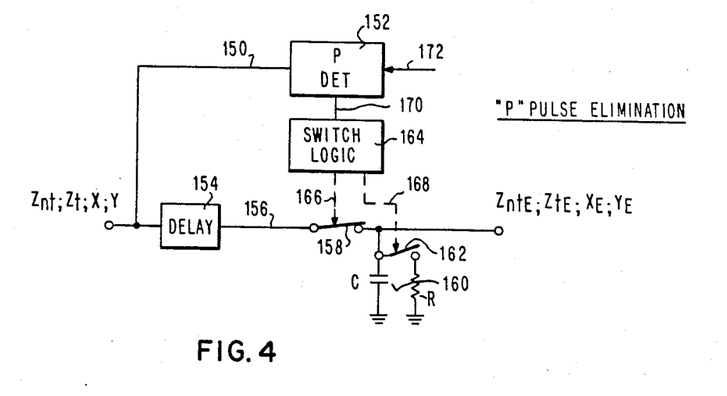
FIG. 4 is a schematic drawing showing the principles of design and operation of the present invention with regard to the elimination of solely piled-up "P" pulses.

A circuit for "P" elimination according to the invention is generally shown in FIG. 4. In this circuit the incoming signal ($Z_{nt}$, $Z_t$, X or Y) is again supplied to a first channel 150 which comprises a "P" pulse detector circuitry 152 for the detection of a "P" pulse. It is also supplied delayed by a delay circuit 154 which has a delay of 100 ns or less (Avionic MD 100 Z 175 for example) to a second channel 156. The second channel 156 again comprises a switch 158 and a RC circuit 160. The RC circuit 160 comprises again a capacitor C and an ohmic resistance R. It also comprises a switch 162. The switch 158 in the second channel 156 is again controlled by a switch logic circuitry 164 via dashed line 166. The switch 162 is controlled by said switch logic circuitry via line 168. The switch logic circuitry 164 is controlled by the "P" pulse detector circuitry 152 via line 170. Via line 172 the "P" pulse detector circuitry is reset at the end of integration time. The "P" pulse detector circuitry 152 is again a leading edge detector (Signetics NE 521 for example) which, by differentiation and comparison, decides within a short period of time—less than 100 ns—whether a pulse piled up on a true valid "T" pulse is a "P" pulse, which has to be eliminated.

The operation of the "P" pulse eliminating circuit of FIG. 4 is very similar to that of the "A" pulse elimination circuit of FIG. 3. Thus if the occurrence of a "P" pulse is detected by the "P" detector circuitry 152 the "P" detector circuitry produces an output signal on line 170. This signal controls the switch logic circuitry 164 such that the switch logic circuitry opens the switch 158 (which normally is closed) in the second channel via line 166 and simultaneously closes switch 162 (which normally is opened) in the RC circuit 160 via line 168. As a result of opening switch 158 the signal in the second channel is interrupted such that the remaining parts of said signal are suppressed. Instead said suppressed remaining signal parts are replaced by the discharging signal of the RC circuit 160 which discharging signal is supplied to the second channel when the switch 162 of the RC circuit is closed. The discharging signal is again produced by the capacitor C of the RC circuit 160 on unloading across the ohmic resistance R. But the starting value of the discharging signal corresponds now to the actual value T' the "T" pulse had at the instant of the occurrence of a "P" pulse. The decay curve of the discharging signal corresponds to the known and constant decay curve of a "T" pulse. Thus the discharging signal of the RC circuit simulates the cut off tail T' of a "T" pulse in the second channel. An integrator circuitry connected to the output of the circuit of FIG. 4 is thus allowed to complete its normal "T" pulse integration period by continuing integration with the feeded in simulated tail instead of the cut off true tail of a "T" pulse.

Figure 5:
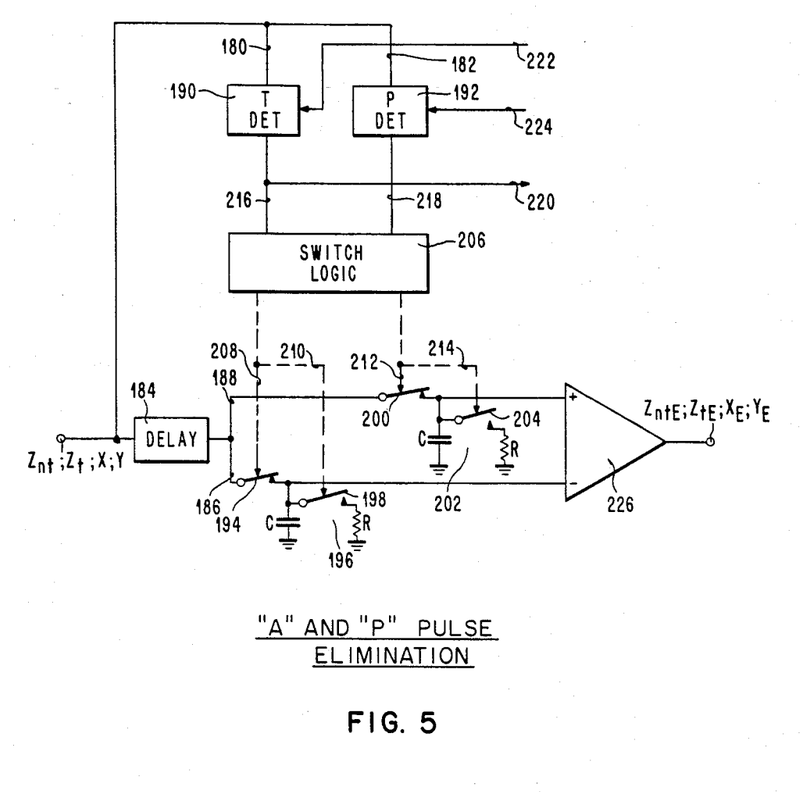
FIG. 5 is a schematic drawing showing the principles of design and operation of the present invention with regard to the elimination of both the tails of "A" pulses and piled-up "P" pulses.

Referring now to FIG. 5, this figure shows a circuit for both "A" pulse and "P" pulse elimination. In this circuit the incoming signal ($Z_{nt}$, $Z_t$, X or Y) is supplied undelayed into a first channel 180 and into a third channel 182. It is also supplied delayed by a delay circuit 184 which has a delay time of 100 ns or less (Avionics MD 100 Z 175 for example), into a second channel 186 and into a fourth channel 188. The first channel 180 comprises a "T" pulse detector circuitry 190 and the third channel 182 comprises a "P" pulse detector circuitry 192. The second channel 186 comprises a first switch 194 and a first RC circuit 196 which comprises a capacitor C and an ohmic resistance R and a second switch 198. The fourth channel 188 comprises a third switch 200 and a second RC circuit 202 which comprises again a capacitor C and an ohmic resistance R and a fourth switch 204. The block 206 is a switch logic circuitry to switch the first switch 194 via dashed line 208, the second switch 198 via dashed line 210, the third switch 200 via dashed line 212 and the fourth switch 204 via dashed line 214. The switch logic circuitry 206 is controlled by the "T" pulse detector circuitry 190 via line 216 and it is also controlled by the "P" pulse detector circuitry via line 218. Via line 220 an integration period IW of an integrator circuitry is started at the occurrence of a "T"

pulse. Via line 222 the "T" pulse detector circuitry 190 and via line 224 the "P" pulse detector circuitry 192 is reset at the end of an integration period IW. The output of the second channel 186 is again connected to the inverting input of a differential amplifier 226 and the output of the fourth channel 188 is connected to the non inverting input of the differential amplifier 226. The "T" pulse detector circuitry 190 and the "P" pulse detector circuitry 192 are again leading edge detectors (both Signetics NE 521 for example) as described before with regard to the circuits of FIGS. 3 and 4.

The operation of the circuit of FIG. 5 is as follows:
With the first switch 194 and the third switch 200 closed and the second switch 198 and the fourth switch 204 opened (i.e. "T" pulse and "P" pulse detector circuitries 190 and 192 reset via lines 222 and 224) the differential amplifier 226 will see equal signals at its inverting (or negative) and non inverting (or positive) inputs, so that the output of the differential amplifier 226 will be zero. The RC circuits 196 and 202 are designed to present a negligeable load on the circuitry driving them. The time constant RC of each of the RC circuits is such that the delay curve of a discharging signal of a RC circuit extrapolates the known and constant decay curve of a "A" or "T" pulse in a signal supplied to the second and fourth channels of the circuitry of FIG. 5. With regard to the specific circuit of FIG. 1 this time constant of the RC circuits 196 and 202 should be about 2.7 μs for example. When now a "T" pulse occurs in the input signal ($Z_{nt}$, $Z_t$, X or Y) of the circuit of FIG. 5 and this "T" pulse is detected by the "T" pulse detector circuitry 190 the normally closed switch 194 in the second channel 186 is opened. Simultaneously the normally opened switch 204 of the RC circuit 196 is closed such that the capacitor C of said RC circuit discharges if it was loaded with a starting value A' of the tail of a preceding "A" pulse. As described with regard to FIG. 3 thus a discharging signal is produced by the RC circuit which simulates the tail of said "A" pulse. By subtracting this simulating signal from the signal in the fourth channel (with switch 200 closed and switch 204 opened) in the differential amplifier 226 a signal ($Z_{ntE}$, $Z_{tE}$, $X_E$ or $Y_E$) is produced at the output of the differential amplifier 226 which corresponds to the true valid "T" pulse. The tail of the preceding "A" pulse is completely eliminated. An integrator circuitry which is connected to the output of the differential amplifier 226 (see FIG. 1) then as desired integrates only the true valid "T" pulse.

The integration of a true valid "T" pulse will normally continue until the end of the integration period IW, i.e. when the "T" pulse detector circuitry 190 is reset via line 222 and switch 194 in the second channel 186 is again closed and simultaneously switch 198 of the RC circuit 196 is again opened. But, in the case a "P" pulse arrives after a sizeable amount of "T" pulse energy already has been integrated (anywhere from 200 ns after "T" leading edge, when more than 65% of the energy has already been integrated up to the end of the integration time, which normally is about 900 ns) the "P" detector circuitry, which again is a leading edge detector, now set at just above the noise level present on the "T" pulse itself, will trigger and open switch 200 in the fourth channel 188 and simultaneously will close switch 204 of the RC circuit 202. Upon the opening of switch 200 however the "T" pulse is cut down and instead the RC circuit 202 is feeding the "T" pulse's simulated tail instead of the true, impaired one into the non inverting input of the differential amplifier 226, thus allowing the system to complete its normal integration period as described with regard to FIG. 4. The circuit of FIG. 5 which has a relatively simple technical design, thus according to the objects of the invention allows higher pulse rates to be validly processed under pile-up conditions, while simultaneously the accuracy of pulse location in a scintillation camera, such as of the Anger type is retained.

Figure 6:
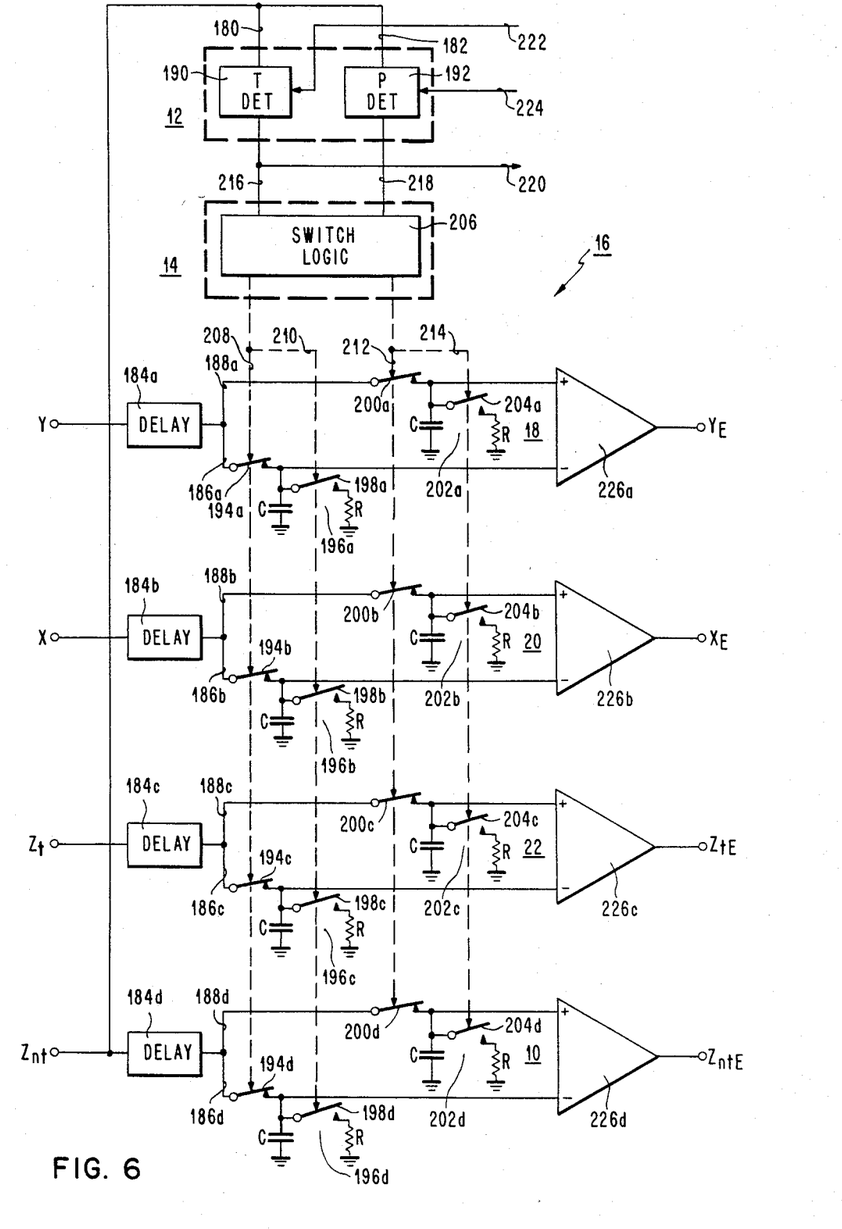
FIG. 6 is a schematic drawing showing the principles of design and operation of the present invention with regard to the elimination of both the tails of "A" pulses and piled-up "P" pulses for use in a scintillation camera in order to correct the Z energy signal and the X and Y coordinate signals.

Referring now to FIG. 6, this figure shows a complete elimination circuitry as indicated by dashed block 16 in the circuit of FIG. 1 used in the connection with a scintillation camera. The circuit of FIG. 6 thus comprises an elimination circuitry for the $Z_{nt}$ signal and an elimination circuitry 22 for the $Z_t$ signal. It further comprises an elimination circuitry 18 for the Y signal and an elimination circuitry 20 for the X signal. All of these elimination circuitries are constructed in the same way as the circuit as described in FIG. 5. Therefore, equivalent components in the circuits of FIG. 5 and FIG. 6 have the same reference numerals with the only exception that in FIG. 6 equivalent components for different elimination circuits are discriminated by different indices a, b, c and d.

Figure 7:
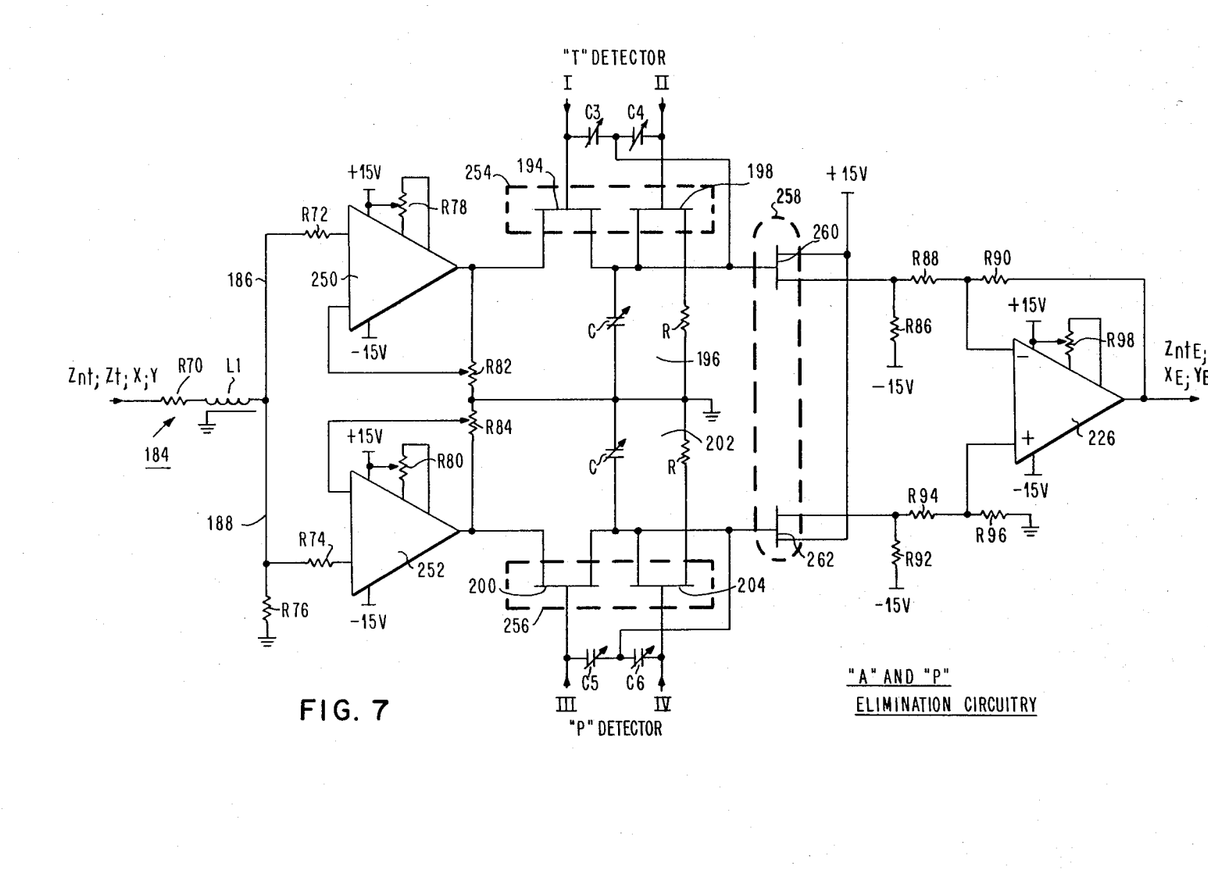
FIG. 7 is a detailed circuit diagram of the "A" and "P" pulses elimination circuitry.
Figure 8:
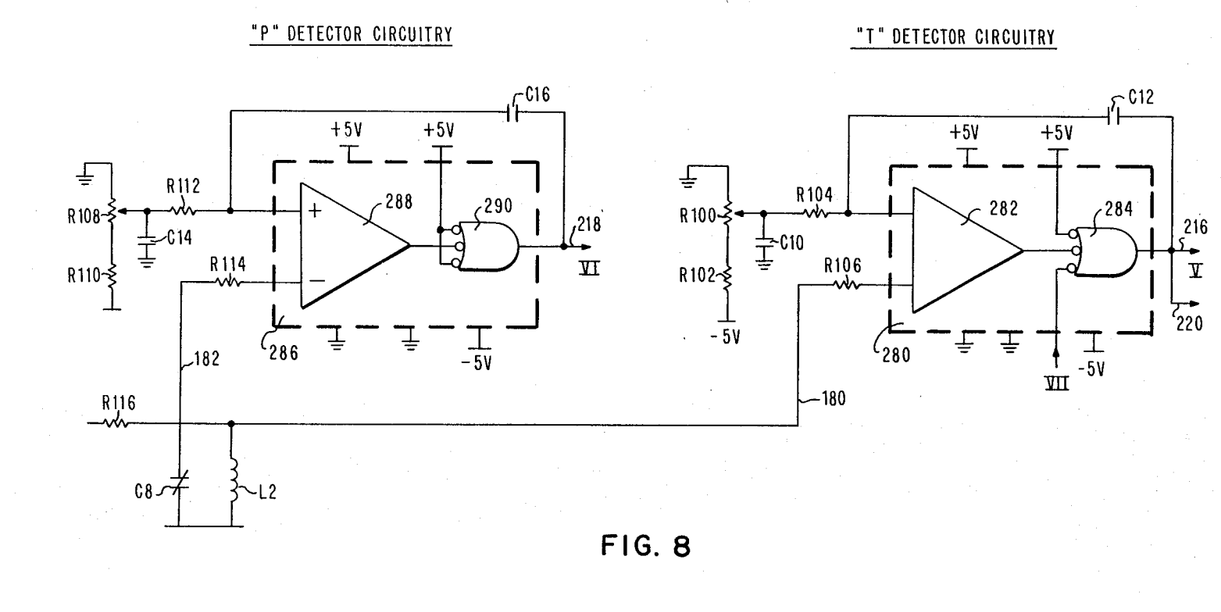
FIG. 8 is a detailed circuit diagram of a "P" and a "T" pulse detector.
Figure 9:
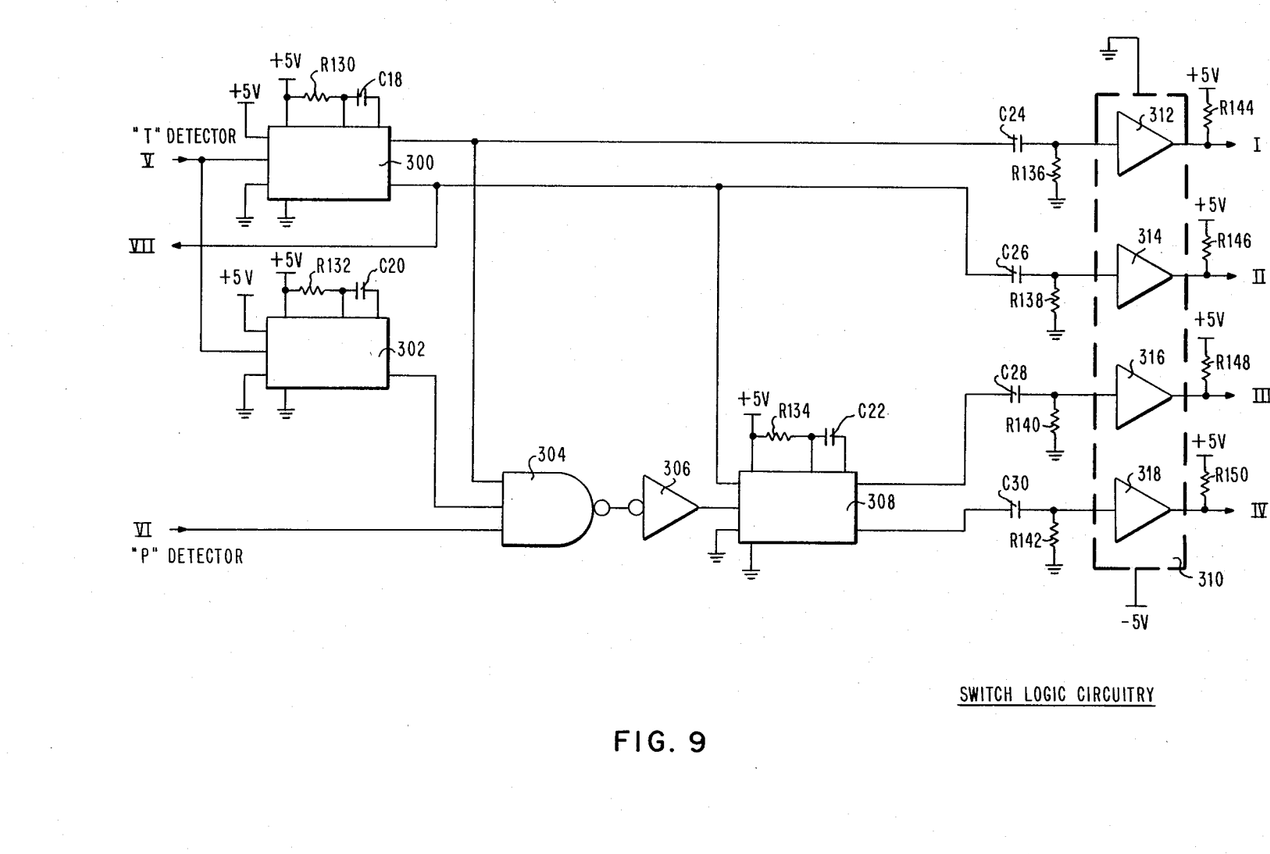
FIG. 9 is a detailed circuit diagram of a switching logic circuitry.

Referring now to FIGS. 7 to 9, these figures showing detailed circuit diagrams of an "A" and "P" pulse elimination circuitry (FIG. 7) and "T" and "P" pulse detector circuitry (FIG. 8) and a switch logic circuitry (FIG. 9).

In FIG. 7 the delay circuit 184 (Avionics MD 100 Z 175 for example) comprises an ohmic resistance R70 and an inductance L1. Besides the differential amplifier 226 the elimination circuit comprises two further operational amplifiers 250 and 252 at the input of the second channel 186 and the input of the fourth channel 188 (all three amplifiers HA 2525 operational amplifiers Harris Semiconductor for example). The elimination circuit further comprises the switches 194, 198, 200 and 204 (each block 254, 256 ½ CD 4016 analog switches of RCA for example), two RC circuits 196, 202 (R=10kΩ, C=9 to 30 pF for example) and a dual Fet 258 (2N3954 of National Semiconductor for example) comprising the Fets 260 and 262. The ohmic resistances may for example have the following values: R72=R74=R88=R90=R94=R96=2.7kΩ; R82=R84=5kΩ; R78=R80=R98=20kΩ; R86=R92=10kΩ; R76=560Ω and R70=470Ω. The capacitors may for example have the following values: C3=C4=C5=C6=0.2 to 2 pF.

In FIG. 8 the "T" pulse detector circuitry comprises a block 280 with operational amplifier 282 and logic circuit 284. The "P" pulse detector circuitry comprises also a block 286 with an operational amplifier 288 and logic circuit 290. Each of the blocks 280 and 286 is for example ½ Signetics NE 521. The ohmic resistances may for example have the following values: R100=R108=100Ω; R102=R110=1kΩ; R104=R106=R118=R114=150Ω; R116=470Ω. The capacitors for example have the following values: C8=9 to 30pF; C10=C14=100pF.

In FIG. 9 the switch logic circuitry comprises a first monostable multivibrator 300 with a pulse time of 1.2 ns, a second monostable multivibrator 302 with a pulse time of 200 ns and a third monostable multivibrator 308 with a pulse time >1.2 μs (each ½ SN 74123 I.C. Texas Instruments for example). It further comprises a logic block 304, 306 (SN7410 I.C. Texas Instruments for example) and an amplifier block 310 (SN7406N I.C. Texas Instruments for example) with amplifiers 312, 314, 316 and 318. The ohmic resistances may for example have the following values: R130=R132=R134=R136=R138=R140=R142=10kΩ; R144=R146=R148=R150=1kΩ. The capacitors may for example have the following values: C18=C20=C22=1000pF; C24=C26=C28=C30=0.1 μF.

The operation of the circuitries of FIGS. 7 to 9 are as follows:

Normally, switches 194 and 200 in the circuitry of FIG. 7 are closed and the switches 198 and 204 are open. Thus, capacitors C follow the output levels of the input operational amplifiers 250 and 252 and the same signals are fed into the output amplifier 226 in counterphase, resulting in no output of the device, regardless of any low level noise or base line offsets. If now the "T" pulse detector circuitry of FIG. 8 detects the steep leading edge of an incoming pulse, a signal is generated through monostable multivibrator 300 in the switch logic circuitry of FIG. 9. The signal opens switch 194 and closes switch 198 in the circuit of FIG. 7. Due to the 100 ns delay of the delay circuit 184 the detected pulse has not yet arrived at the switches 194 and 198. The base line offset level as generated by a decaying preceding "A" pulse was there, and charged C of the RC circuit 196 to that level. After switching, C of the RC circuit 196 discharges through R and simulates the exponential base line decay of the tail of the "A" pulse into the inverting (negative) input of the differential amplifier 226, in opposition to the "T" pulse with base line offset being fed into the non inverting (positive) input through switch 256, resulting in pulse "T" less offset appearing at the output of the differential amplifier 226. Assume now that a valid "T" pulse (having arrived on a clean or on an offset baseline) is being processed (integrated) at the circuitry output. If now an interfering "P" pulse occurs anywhere from 200 ns after "T" pulse leading edge, up till the end of integration time (normally 900 ns), then its leading edge will be detected by the "P" pulse detector circuitry of FIG. 8. This, through the monostable multivibrator 308 in the switch logic circuitry of FIG. 9 will result in switch 200 in the circuitry of FIG. 7 to open and switch 208 to close. Thus, the incoming mutilated "T" pulse is switched off from the non inverting input of the differential amplifier 226 and instead the discharging signal of the RC circuit 202, which simulates the cut off exponential decay tail of the "T" pulse, is fed to the non inverting input. The "T" pulse detector and the "P" pulse detector both sense the leading edge of any incoming pulse. However, as monostable multivibrator 308 in the switch logic circuitry of FIG. 9 is set by the "T" pulse detector, the "P" pulse detector is effective in operating the switches 194 and 200 during a limited period (greater than integration time) after the "T" pulse detector only.

Referring finally to FIGS. 10 to 15. In the oscilloscope patterns shown there, the top traces always represent an unprocessed pulse of a signal $Z_{nt}$, $Z_t$, X or Y as it enters a circuit as described in the Figures before. The bottom traces show the processed, i.e. integrated, "T" pulse ($Z_{ntEI}$, $Z_{tEI}$, $X_{EI}$, $Y_{EI}$ in FIGS. 1A, 1B respectively) after "A" and "P" pulses have been eliminated.

Figure 10:
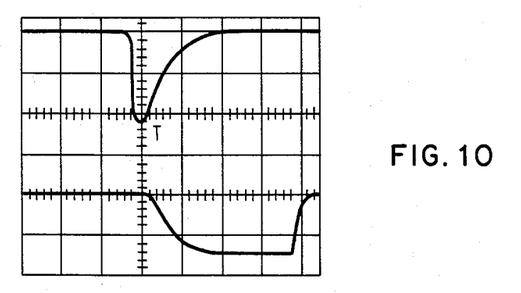
FIGS. 10–15 are sets of oscilloscope patterns showing several pulses to be processed together with "A" pulses and/or "P" pulses and the appropriate pulse results at the end of processing.

In detail, the FIGS. 10 to 15 show the following patterns:

FIG. 10 shows in the top trace an unimparied, i.e. valid true "T" pulse having no baseline offset by the tail of an "A" pulse nor interference by an "P" pulse. The baseline shows the integration signal.

Figure 11:
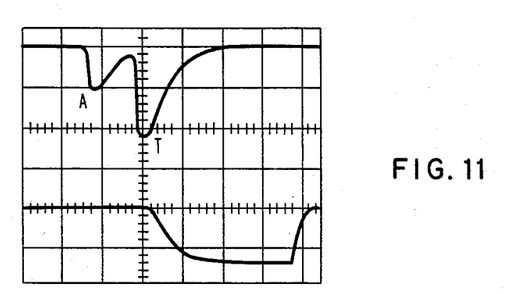

FIG. 11 shows in the integration trace the same "T" pulse as shown in FIG. 10, but on the tail of an "A" pulse, which makes the "T" pulse appear higher than it actually is. After elimination of the tail of the "A" pulse according to the invention, the integration signal, as shown in the baseline, has the same size as this one in FIG. 10.

Figure 12:
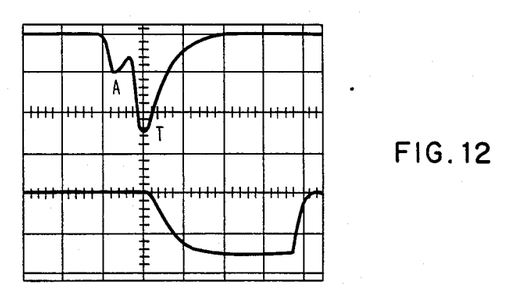
Figure 13:
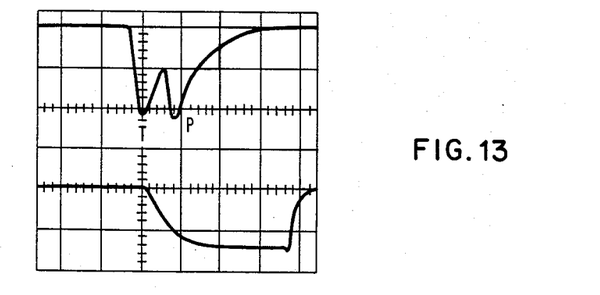
Figure 14:
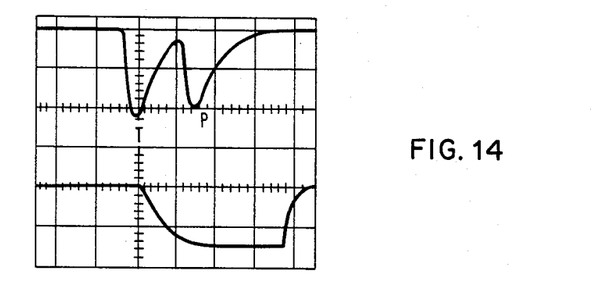
Figure 15:
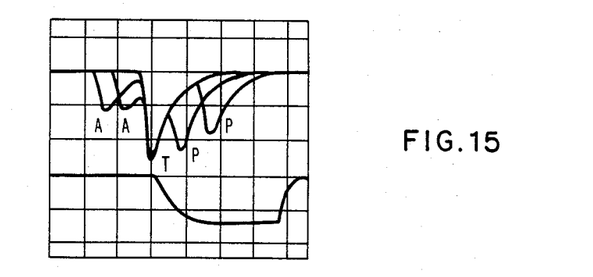

The same result show the integration signals of the "T" pulses shown in FIGS. 12 to 15. FIG. 12 shows the same "A" and "T" pulse configuration as FIG. 11 but at closer timing. FIG. 13 shows a "P" pulse piled up on the "T" pulse. FIG. 14 shows the same situation at different timing. FIG. 15 finally shows all situations described before superimposed. This figure shows best how the rough "T" pulse varies in height while the integrated output shown in the bottom trace is perfectly constant so as it is demonstrated in FIGS. 10 to 14 before.

Having thus described the invention with particular reference to the preferred forms thereof, it will be obvious to those skilled in the art to which the invention pertains, after understanding the invention, that various changes and modifications may be made therein without departing from the spirit and scope of the invention as defined by the claims appended hereto. It will be appreciated that the selection, connection and layout of the various components of the described configurations may be varied to suit individual tastes and requirements.

What is claimed is:

1. A method for processing pulses of a pulse train such that tails of pulses which precede a pulse to be processed are eliminated, wherein said tails of said preceding pulses have a known and constant decay curve, the method comprising the following steps:
   (a) producing a signal at the occurrence of a pulse to be processed, which signal extrapolates the known and constant decay curve of the tail of a preceding pulse,
   (b) superimposing said extrapolating signal with said pulse to be processed to form a differential signal,
   (c) providing said differential signal for processing.

2. A method as recited in claim 1, wherein said extrapolating signal has the same polarity as the known and constant curve of said tail of said preceding pulse; and
   said extrapolating signal is subtracted from said pulse to be processed.

3. A method as recited in claim 1, comprising the following steps:
   (a) applying said pulses to be processed into a first channel for pulse detection and into a second channel,
   (b) evaluating said pulses in said first channel for producing a switching signal when a pulse to be processed is detected,
   (c) switching in response to said switching signal to switch said detected pulse off said second channel and instead switching said extrapolating signal on said second channel,
   (d) superimposing said extrapolating signal in said second channel with said detected pulse to form a differential signal.

4. A method as recited in claim 3, further comprising the following steps:
   (a) applying said pulses to be processed to a third channel; and (b) superimposing said extrapolating signal in said second channel with said pulses in said third channel to form a differential signal.

5. A method as recited in claim 3, comprising the following steps:
(a) storing the actual value of a switched off pulse in said second channel at least at the instant of the occurrence of a switching signal; and
(b) unloading said stored actual value with a time constant which time constant extrapolates the known and constant decay curve of the pulse tail, into the second channel, if said stored actual value is different from the pulse baseline.

6. A method as recited in claim 1, wherein said extrapolating signal is the discharge signal of an RC-circuit.

7. A method as recited in claim 3, wherein said pulses to be processed are applied undelayed into said first channel and delayed into said second channel.

8. A method as recited in claim 4, wherein said pulses to be processed are applied undelayed into said first channel and delayed into said second and third channel.

9. A method as recited in claim 7, wherein said pulses to be processed are applied delayed into said second channel with a delay time corresponding to at least the switching time of said switching signal.

10. A method as recited in claim 8, wherein said pulses to be processed are applied delayed into said second channel and said third channel with a delay time corresponding to at least the switching time of said switching signal.

11. A method as recited in claim 9, wherein said delay time essentially corresponds to 100 ns.

12. A method as recited in claim 10, wherein said delay time essentially corresponds to 100 ns.

13. A method as recited in claim 1, wherein said pulses to be processed emanating from detected radioactive events.

14. A method as recited in claim 13, wherein said pulses to be processed are produced in a scintillation camera as a detector of radioactive events.

15. A method as recited in claim 1, wherein said pulses to be processed are applied for integration.

16. A method for processing pulses of a pulse train such that pile-up pulses which are piled up on the tails of preceding pulses to be processed are eliminated, the method comprising the following steps:
(a) producing a signal at the occurrence of a pile-up pulse following a pulse to be processed wherein said signal extrapolates the known and constant decay curve of the tail of said pulse to be processed.
(b) suppressing those remaining parts of said pulses which are not yet processed at the instant of the occurrence of said pile-up pulse; and
(c) replacing said suppressed remaining parts of said pulses by said extrapolating signal.

17. A method as recited in claim 16, comprising the following steps:
(a) applying said pulses to be processed into a first channel for the detection of pile-up pulses and into a second channel,
(b) evaluating said pulses in said first channel for producing a switching signal when a pile-up pulse is detected,
(c) said switching signal then switches those remaining parts of said pulses which are not yet processed off said second channel, and instead said switching signal switches said extrapolating signal on said second channel.

18. A method as recited in claim 17, further comprising the following steps:
(a) storing the actual first value of the switched off remaining parts of said pulses minimally at the instant of the occurrence of a switching signal; and
(b) unloading said stored actual first value with a time constant which time constant extrapolates the known and constant decay curve of the switched off remaining parts of the pulses to be processed.

19. A method as recited in claim 16, wherein said extrapolating signal is the discharge signal of an RC-circuit.

20. A method as recited in claim 16, wherein said extrapolating signal is produced, when a pile-up pulse arrives after a sizable time interval after processing of a pulse has begun.

21. A method as recited in claim 20, wherein said time interval is about 240 ns.

22. A method as recited in claim 17, wherein said pulses to be processed are applied undelayed into said first channel and delayed into said second channel.

23. A method as recited in claim 22, wherein said pulses to be processed are applied delayed into said second channel with a delay time corresponding to at least the switching time of said switching signal.

24. A method as recited in claim 22, wherein said delay time is about 100 ns.

25. A method as recited in claim 16, wherein said pulses to be processed emanating from detected radioactive events.

26. A method as recited in claim 25, wherein said pulses to be processed are produced in a Scintillation camera as a detector for radioactive events.

27. A method as recited in claim 16, wherein said pulses to be processed are applied for integration.

28. A method as recited in claim 1 for further processing said pulses of said pulse train such that pile-up pulses which are piled up on the tails of preceding pulses to be processed are eliminated, the method further comprising the following steps:
(a) producing a second signal at the occurrence of a pile-up pulse following a pulse to be processed wherein said second signal extrapolates the known and constant decay curve of the tail of said pulse to be processed,
(b) suppressing those remaining parts of said pulses which are not yet processed at the instant of the occurrence of said pile-up pulse; and
(c) replacing said suppressed remaining parts of said pulses by said second extrapolating signal.

29. A method as recited in claim 3 for further processing said pulses of said pulse train such that pile-up pulses which are piled up on the tails of preceding pulses to be processed are eliminated, the method further comprising the following steps:
(a) applying said pulses to be processed into a third channel for the detection of pile-up pulses and into a fourth channel,
(b) evaluating said pulses in said third channel for producing a switching signal when a pile-up pulse is detected,
(c) producing a second signal at the occurrence of said switching signal wherein said second signal extrapolates the known and constant decay curve of the tail of said pulse to be processed in said fourth channel; and (d) said switching signal then switches those remaining parts of said pulses which are not yet processed off said fourth channel, and instead said switching signal switches said second extrapolating signal on said fourth channel.

30. A method as recited in claim 29, wherein said pulses to be processed are applied undelayed into said first and third channel and delayed into said second and fourth channel.

31. A method as recited in claim 30, wherein said pulses to be processed are applied delayed into said second and fourth channel with a delay time corresponding to at least the switching time of a switching signal produced at the occurrence of a pulse to be processed and a switching signal produced at the occurrence of a pile-up pulse.

32. A method as recited in claim 31, wherein said delay time is about 100 ns.

33. A method as recited in claim 28, wherein the first extrapolation signal is a discharge signal of a first RC-circuit and the second extrapolation signal is a discharge signal of a second RC-circuit.

34. A circuit for processing pulses of a pulse train such that tails of pulses which precede a pulse to be processed are eliminated, wherein said tails of said preceding pulses have a known and constant decay curve, the circuit comprising:
 (a) means for producing a signal at the occurrence of a pulse to be processed, which signal extrapolates the known and constant decay curve of the tail of a preceding pulse,
 (b) means for superimposing said extrapolating signal with said pulse to be processed to form a differential signal; and
 (c) means for providing said differential signal for processing.

35. A circuit as recited in claim 34, wherein said means for producing said extrapolating signal produces an extrapolation signal, which has the same polarity as the known and constant curve of said tail of said preceding pulse and wherein said superimposing means comprise substracting means for substracting said extrapolating signal from said pulse to be processed.

36. A circuit as recited in claim 35, wherein said substracting means comprises a differential amplifier.

37. A circuit as recited in claim 34, further comprising:
 (a) means for applying said pulses to be processed into a first channel which comprises a pulse detector for pulse detection and into a second channel,
 (b) means for evaluating said pulses in said first channel for producing a switching signal when a pulse to be processed is detected,
 (c) switching means controlled by said switching signal for switching said detected pulse off said second channel at the occurrence of said switching signal and instead said switching means switching said extrapolating signal on said second channel; and
 (d) means for superimposing said extrapolating signal in said second channel with said detected pulse to form a differential signal.

38. A circuit as recited in claim 37, further comprising:
 (a) means for applying said pulses to be processed to a third channel; and
 (b) means for superimposing said extrapolating signal in said second channel with said pulses in said third channel to form a differential signal.

39. A circuit as recited in claim 37, comprising:
 (a) means for storing the actual value of a switched off pulse in said second channel at least at the instant of the occurrence of a switching signal; and
 (b) means for unloading said stored actual value with a time constant which time constant extrapolates the known and constant decay curve of the pulse tail, into the second channel, if said stored actual value is different from the pulse baseline.

40. A circuit as recited in claim 39, wherein said storing and unloading means comprise an RC-circuit.

41. A circuit recited in claim 37, comprising a delay circuit at the input of said second channel.

42. A circuit as recited in claim 38 comprising at least a delay circuit at the inputs of said second and third channels.

43. A circuit as recited in claim 41, wherein the delay time of said delay circuit is about 100 ns.

44. A circuit as recited in claim 42, wherein the delay time of said delay circuit is about 100 ns.

45. A circuit for processing pulses of a pulse train such that pile-up pulses which are piled up on the tails of preceding pulses to be processed are eliminated, the circuit comprising:
 (a) means for producing a signal at the occurrence of a pile-up pulse following a pulse to be processed wherein said signal extrapolates the known and constant decay curve of the tail of said pulse to be processed,
 (b) means for suppressing those remaining parts of said pulses which are not yet processed at the instant of the occurrence of said pile-up pulse; and
 (c) means for replacing said suppressed remaining parts of said pulses by said extrapolating signal.

46. A circuit as recited in claim 45, comprising:
 (a) means for applying said pulses to be processed into a first channel which comprises a pulse detector for the detection of pile-up pulses and into a second channel,
 (b) means for evaluating said pulses in said first channel for producing a switching signal when a pile-up pulse is detected,
 (c) switching means controlled by said switching signal which switch those remaining parts of said pulses which are not yet processed off said second channel at the occurrence of a switching signal and instead said switching means switch said extrapolating signal on said second channel.

47. A circuit as recited in claim 45, further comprising:
 (a) means for storing the actual first value of the switched off remaining parts of said pulses minimally at the instant of the occurrence of a switching signal; and
 (b) means for unloading said stored actual first value with a time constant which time constant extrapolates the known and constant decay curve of the switched off remaining parts of the pulses to be processed.

48. A circuit as recited in claim 47, wherein said storing means and said unloading means comprise an RC-circuit.

49. A circuit as recited in claim 46, comprising a delay circuit at the input of said second channel.

50. A circuit as recited in claim 49, wherein the delay time of said delay circuit is about 100 ns.

51. A circuit as recited in claim 34, for further processing said pulses of said pulse train such that pile-up pulses which are piled up on the tails of preceding pulses to be processed are eliminated, the circuit further comprising:
 (a) means for producing a second signal at the occurrence of a pile-up pulse following a pulse to be processed wherein said second signal extrapolates the known and constant decay curve of the tail of said pulse to be processed,
 (b) means for suppressing those remaining parts of said pulses which are not yet processed at the instant of the occurrence of said pile-up pulse; and
 (c) means for replacing said suppressed remaining parts of said pulses by said second extrapolating signal.

52. A circuit as recited in claim 37 for further processing said pulses of said pulse train such that pile-up pulses which are piled up on the tails of preceding pulses to be processed are eliminated, the method further comprising:
 (a) means for applying said pulses to be processed into a third channel which comprises a pulse detector for the detection of pile-up pulses and into a fourth channel,
 (b) means for evaluating said pulses in said third channel for producing a switching signal when a pile-up pulse is detected,
 (c) means for producing a second signal at the occurrence of said switching signal wherein said signal extrapolates the known and constant decay curve of the tail of said pulse to be processed in said fourth channel; and
 (d) switching means controllable by said switching signal for switching those remaining parts of said pulses which are not yet processed off said fourth channel, at the occurrence of said switching signal and instead said switching means switch said second extrapolating signal on said fourth channel.

53. A circuit as recited in claim 51, comprising at least a delay circuit at the input of said second and fourth channel.

54. A circuit as recited in claim 53, wherein said delay time of said delay circuit is about 100 ns.

55. A circuit as recited in claim 51, comprising a first RC-circuit for producing said first extrapolation signal and a second RC-circuit for producing said second extrapolation signal.

* * * * *